(12) United States Patent
Wu et al.

(10) Patent No.: US 8,264,760 B2
(45) Date of Patent: Sep. 11, 2012

(54) E-INK DISPLAY DEVICE AND METHOD FOR MANUFACTURING THE SAME

(75) Inventors: Ho-Chien Wu, Hsin-Chu (TW);
Chih-Cheng Chan, Hsin-Chu (TW);
Chia-Tien Peng, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 143 days.

(21) Appl. No.: 13/004,436

(22) Filed: Jan. 11, 2011

(65) Prior Publication Data

US 2011/0299151 A1 Dec. 8, 2011

(30) Foreign Application Priority Data

Jun. 4, 2010 (TW) .............................. 99118191 A (51) Int. Cl.
*G02F 1/03* (2006.01)
*G02B 26/00* (2006.01)
*H01J 9/26* (2006.01)
(52) U.S. Cl. ........ 359/245; 359/296; 359/315; 345/107; 156/247; 156/256; 445/25; 349/153
(58) Field of Classification Search .................. 359/245, 359/228, 254, 267, 296; 345/84, 105–107; 345/204; 156/256, 325; 204/192.1; 445/25, 445/58; 257/59; 349/153; 313/512
See application file for complete search history.

(56) References Cited

U.S. PATENT DOCUMENTS

| | | | |
|---|---|---|---|
| 6,982,178 B2 * | 1/2006 | LeCain et al. .................. | 438/22 |
| 7,236,292 B2 * | 6/2007 | LeCain et al. ................. | 359/296 |
| 7,242,375 B2 * | 7/2007 | Hayashi et al. ................. | 345/76 |
| 7,554,712 B2 * | 6/2009 | Patry et al. .................... | 359/254 |
| 7,649,674 B2 * | 1/2010 | Danner et al. ................. | 359/296 |
| 7,884,363 B2 * | 2/2011 | Hsu et al. ......................... | 257/59 |
| 7,898,717 B2 * | 3/2011 | Patry et al. .................... | 359/245 |
| 8,027,081 B2 * | 9/2011 | Danner et al. ................. | 359/296 |
| 8,208,193 B2 * | 6/2012 | Patry et al. .................... | 359/296 |
| 2007/0211002 A1 | 9/2007 | Zehner et al. | |
| 2011/0286077 A1 * | 11/2011 | Chan et al. .................... | 359/296 |

* cited by examiner

*Primary Examiner* — Loha Ben
(74) *Attorney, Agent, or Firm* — WPAT., P.C.; Justin King (57) ABSTRACT

An E-ink display device includes an active element array substrate, an E-ink layer, a protective layer and a sealant. The active element array substrate has a surface, and the surface includes a contacting region and a sealing region. The E-ink layer is disposed on the contacting region and has a first side wall, and a first included angle defined between the first side wall and the surface being smaller than 90 degrees or larger than 90 degrees. The protective layer is disposed on the E-ink layer and has a second side wall, and a second included angle defined between the second side wall and the surface is smaller than 90 degrees or larger than 90 degrees. The sealant is disposed on the sealing region and surrounds the E-ink layer and the protective layer. A method for manufacturing the E-ink display device is also provided.

13 Claims, 8 Drawing Sheets

E-INK DISPLAY DEVICE AND METHOD FOR MANUFACTURING THE SAME

FIELD OF THE INVENTION

The present invention relates to a display device and a method for manufacturing the display device, and more particularly to an E-ink display device and a method for manufacturing the E-ink display device.

BACKGROUND OF THE INVENTION

E-ink display devices can display image by controlling an electric filed to change a distribution of charged particles so as to change reflectivity of the ambient light. Base on the above display principle, the E-ink display devices have bistability and do not need the additional light source. Therefore, the E-ink display devices have a high power-saving feature, so the E-ink display devices can meet the need of modern technology on the display devices.

Figure 1:
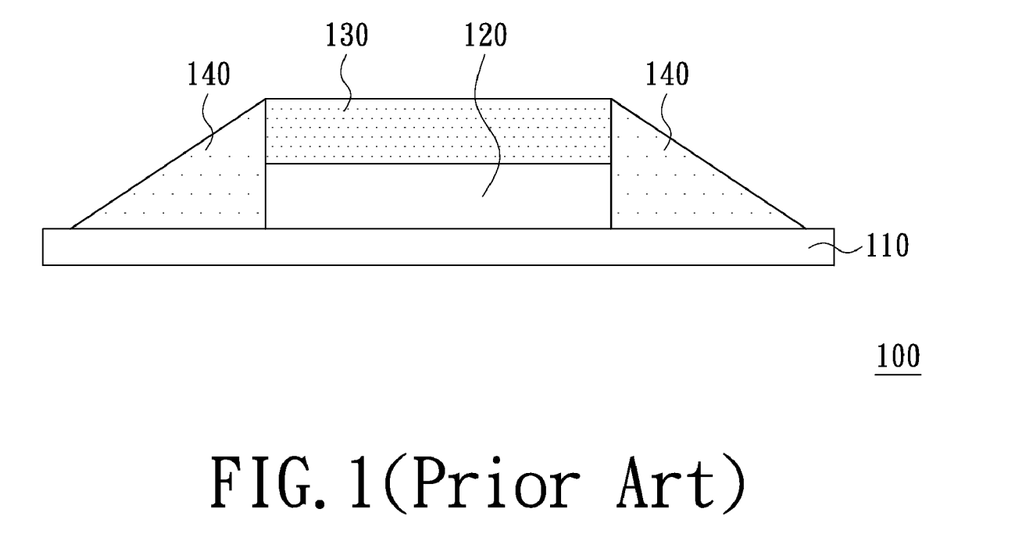
FIG. 1 is a schematic cross-sectional view of a conventional E-ink display device.

FIG. 1 is a schematic cross-sectional view of a conventional E-ink display device. Referring to FIG. 1, the E-ink display device 100 includes an active element array substrate 110, an E-ink layer 120, a waterproof film 130 and a sealant 140. The E-ink layer 120 is disposed on the active element array substrate 110. The waterproof film 130 is disposed on the E-ink layer 120, so that the waterproof film 130 can cooperate with the sealant 140 that surrounds the E-ink layer 120 to prevent outside moisture from entering the E-ink layer 120. However, a waterproof performance of the sealant 140 is worse than that of the waterproof film 130, and the outside moisture tends to penetrate into the E-ink layer 120 through the sealant 140.

Figure 2A:
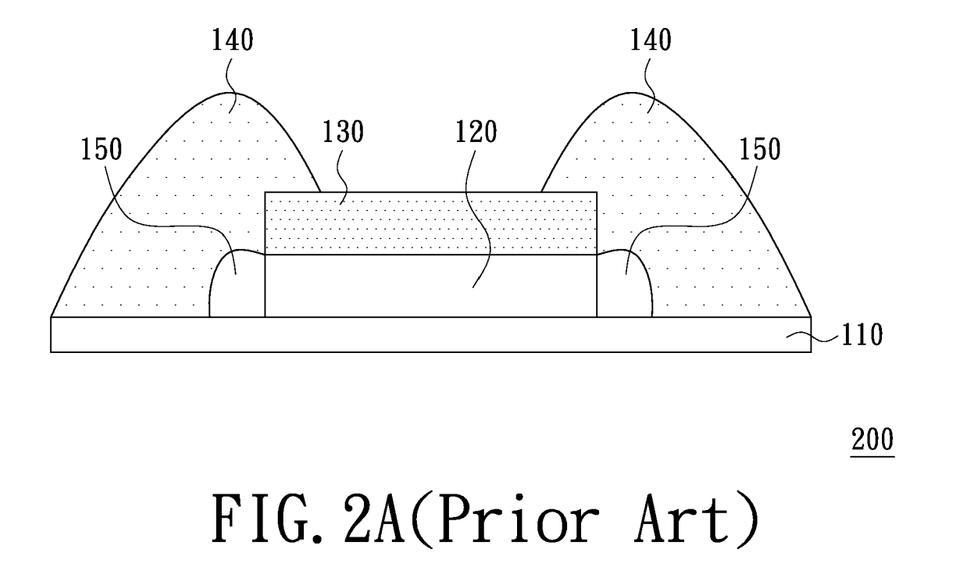
FIGS. 2A and 2B are cross-sectional, schematic views of another conventional E-ink display device.
Figure 2B:
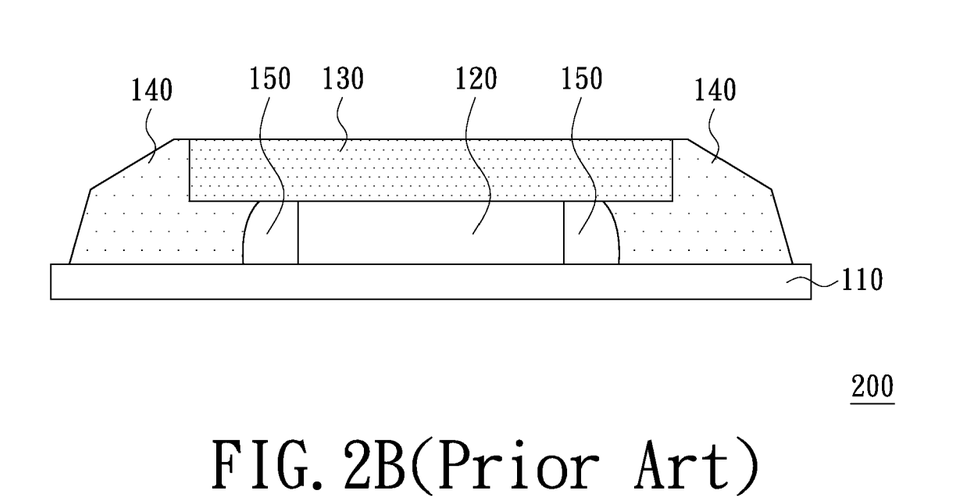

To improve the waterproof performance of the E-ink display device, a conventional approach is that the sealant 140 is extended to a top of the waterproof film 130 from a periphery of the E-ink layer 120, as shown in FIG. 2A. As such, a path from which the outside moisture may penetrate into the E-ink layer 120 through the sealant 140 can be prolonged. Another conventional approach is that the waterproof film 130 with a relatively larger size is disposed on the E-ink layer 120, as shown in FIG. 2B. As such, a path from which the outside moisture may penetrate into the E-ink layer 120 through sealant 140 can be prolonged.

However, in the above two approaches, air bubbles 150 may be generated easily between the E-ink layer 120 and the sealant 140 in a process of forming the sealant 140. The air bubbles 150 would degrade the waterproof performance of the E-ink display device 200. Furthermore, in the subsequently process of heating to cure the sealant 140, thermal expansion of the air bubbles 150 may make the sealant 140 break, and that would decrease process yield of the E-ink display device 200. To avoid generating the air bubbles 150, coating speed for forming the sealant 140 needs to be reduced so as to prolong exhaust time in the process of forming the sealant 140. However, if the exhaust time is prolonged, the production rate of the E-ink display device 200 would be decreased, and thus the production cost of the E-ink display device 200 would be increased.

SUMMARY OF THE INVENTION

Therefore, the present invention provides an E-ink display device having an improved waterproof performance.

The present invention also provides a method for manufacturing an E-ink display device to improve a waterproof performance of the E-ink display device and increase process yield of the E-ink display device.

The present invention provides an E-ink display device, which includes an active element array substrate, an E-ink layer, a protective layer and a sealant. The active element array substrate has a surface, and the surface includes a contacting region and a sealing region. The E-ink layer is disposed on the contacting region and has a first side wall, a first included angle defined between the first side wall and the surface being smaller than 90 degrees or larger than 90 degrees. The protective layer is disposed on the E-ink layer and has a second side wall, a second included angle defined between the second side wall and the surface being smaller than 90 degrees or larger than 90 degrees. The sealant is disposed on the sealing region and surrounds the E-ink layer and the protective layer.

In an embodiment of the present invention, the first side wall and the second side wall are substantially aligned on the same plane, and the sealant is extended from a top of the protective layer to the sealing region along the second side wall and the first side wall.

In an embodiment of the present invention, the sealant is made of adhesive material with viscosity in the range from 20,000 centipoises (cp) to 60,000 cp.

In an embodiment of the present invention, the E-ink layer has a first surface, the protective layer has a second surface, an area of the second surface is larger than that of the first surface, and the first surface is in contact with a portion of the second surface.

In an embodiment of the present invention, the sealant is made of adhesive material with viscosity in the range from 10,000 cp to 70,000 cp.

The present invention also provides a method for manufacturing an E-ink display device, which includes the following steps. First, an active element array substrate having a surface is provided, the surface including a contacting region and a sealing region. Next, an E-ink layer and a protective layer are cut, such that the E-ink layer has a first side wall and the protective layer has a second side wall. Next, the E-ink layer is disposed on the contacting region, and a first included angle defined between the first side wall and the surface is smaller than 90 degrees or larger than 90 degrees. Next, the protective layer is disposed on the E-ink layer, and a second included angle defined between the second side wall and the surface is smaller than 90 degrees or larger than 90 degrees. Next, a sealant is disposed on the sealing region to surround the E-ink layer and the protective layer.

In an embodiment of the present invention, a process of cutting the E-ink layer and the protective layer is performed by laser cutting.

In an embodiment of the present invention, the E-ink layer and the protective layer are cut in the same cutting process. A process of forming the sealant includes dripping adhesive material from above the protective layer, thereby the adhesive material flowing from a top of the protective layer to the active element array substrate along the first side wall and the second side wall. Then, the adhesive material is cured to form the sealant that covers a portion of the protective layer, the first side wall, the second side wall and a portion of the sealing region.

In an embodiment of the present invention, the E-ink layer has a first surface, the protective layer has a second surface, and the E-ink layer and the protective layer are cut in different cutting processes to make an area of the second surface be larger than that of the first surface. In a process of disposing the protective layer on the E-ink layer, a portion of the second surface is applied to contact with the first surface.

The present invention provides another E-ink display device, which includes an active element array substrate, an E-ink layer, a protective layer and a sealant. The active element array substrate has a surface, and the first surface includes a contacting region and a sealing region. The E-ink layer is disposed on the contacting region and has a first side wall and a first surface, wherein a first included angle defined between the first side wall and the surface is smaller than 90 degrees or larger than 90 degrees. The protective layer is disposed on the E-ink layer and has a second surface, and an area of the second surface is larger than that of the first surface. A portion of the second surface is in contact with the first surface. The sealant is disposed on the sealing region and surrounds the E-ink layer and the protective layer.

In an embodiment of the present invention, the sealant is made of adhesive material with viscosity in the range from 10,000 cp to 70,000 cp.

The present invention also provides another method for manufacturing an E-ink display device, which includes the following steps. First, an active element array substrate having a surface is provided, and the surface includes a contacting region and a sealing region. Next, an E-ink layer is cut to make the E-ink layer have a first side wall. Next, the E-ink layer is disposed on the contacting region, wherein a first included angle defined between the first side wall and the surface is smaller than 90 degrees or larger than 90 degrees. Next, the protective layer is disposed on a first surface of the E-ink layer, the protective layer has a second surface, an area of the second surface is larger than that of the first surface, and a portion of the second surface is in contact with the first surface. Then, a sealant is formed on the sealing region to surround the E-ink layer and the protective layer.

In an embodiment of the present invention, a process of cutting the E-ink layer is performed by laser cutting.

The E-ink display device of the present invention includes the E-ink layer that has the side wall tilted relative to the surface of the active element array substrate, so that in the subsequently process of forming the sealant, the liquid adhesive material can flow to the active element array substrate along the side wall, and thus air bubbles would not be generated between the E-ink layer and the sealant. Consequently, the process yield of the E-ink display device can be increased, and the reliability of the E-ink display device can be improved.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3A:
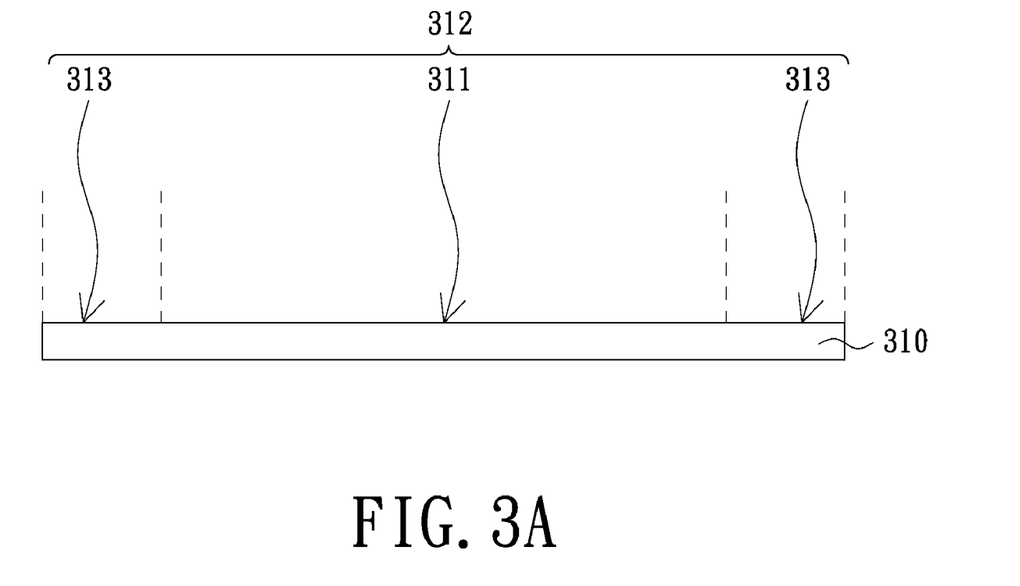
FIGS. 3A to 3D are cross-sectional, schematic views of an E-ink display device in some steps of manufacturing process according to an exemplary embodiment of the present invention.

FIGS. 3A to 3D are cross-sectional, schematic views of an E-ink display device in some steps of manufacturing process according to an exemplary embodiment of the present invention. Referring to FIG. 3A, first, an active element array substrate 310 is provided. The active element array substrate 310 has a surface 312. The surface 312 includes a contacting region 311 and a sealing region 313. In the embodiment, the active element array substrate 310 can be a thin film transistor array substrate, and the present invention is not limited herein.

Figure 3B:
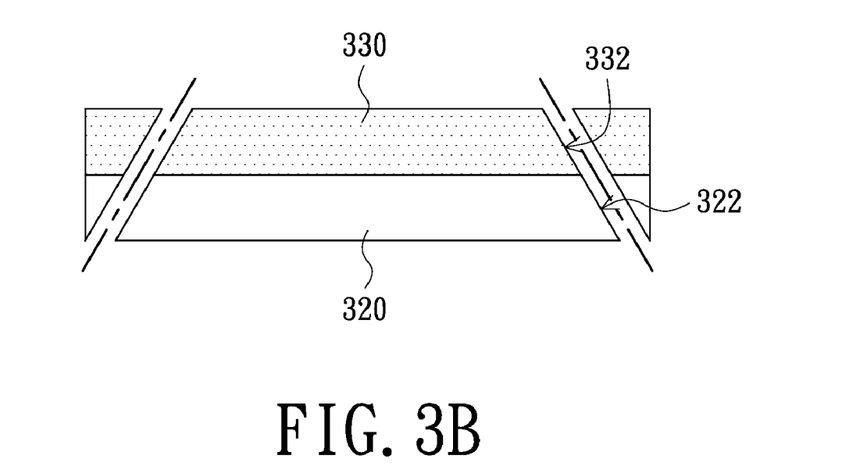

Referring to FIG. 3B, next, an E-ink layer 320 and a protective layer 330 are cut, such that the E-ink layer 320 can have an oblique first side wall 322 and the protective layer 330 can have an oblique second side wall 332. In the embodiment, a process of cutting the E-ink layer 320 and the protective layer 330 can be performed by laser cutting, and the present invention is not limited herein. The E-ink layer 320 and the protective layer 330 are, for example, cut in the same cutting process, so that the first side wall 322 and the second side wall 332 can be substantially aligned on the same plane. In addition, the E-ink layer 320 can be, but not limited to, an electrophoretic layer, an electro-wetting layer or a quick response liquid powder layer.

Figure 3C:
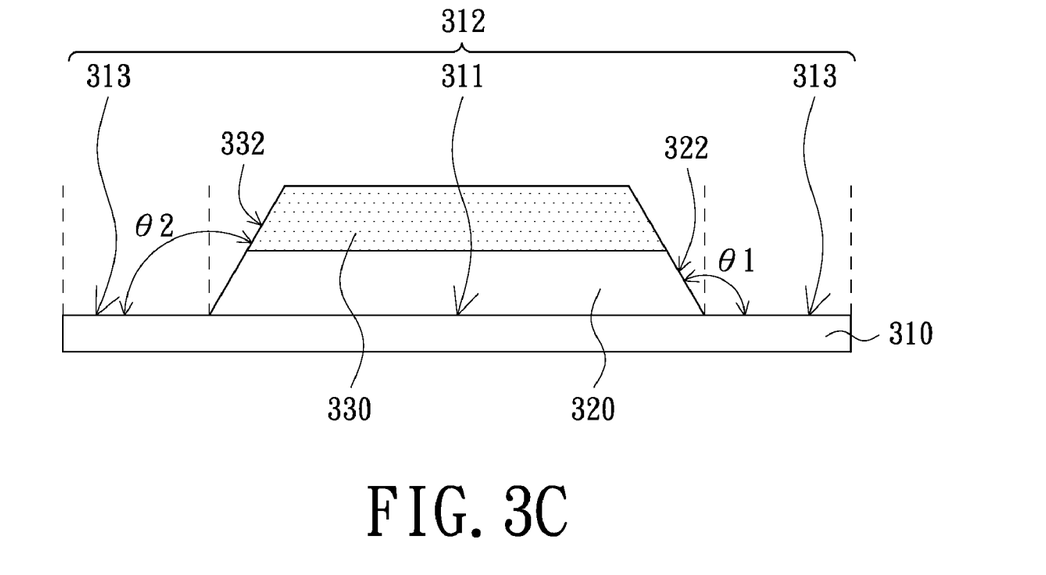

Referring to FIG. 3C, next, the E-ink layer 320 is disposed on the contacting region 311 of the surface 312 of the active element array substrate 310, and the protective layer 330 is disposed on the E-ink layer 320. In the embodiment, the E-ink layer 320 and the protective layer 330 are cut in the same cutting process, and therefore the first side wall 322 and the second side wall 332 are substantially aligned on the same plane. Furthermore, in the embodiment, a first included angle θ1 defined between the first side wall 322 of the E-ink layer 320 and the sealing region 313 of the surface 312 is larger than 90 degrees, a second included angle θ2 defined between the second side wall 332 of the protective layer 330 and sealing region 313 of the surface 312 is larger than 90 degrees, and the present invention is not limited herein.

Figure 3D:
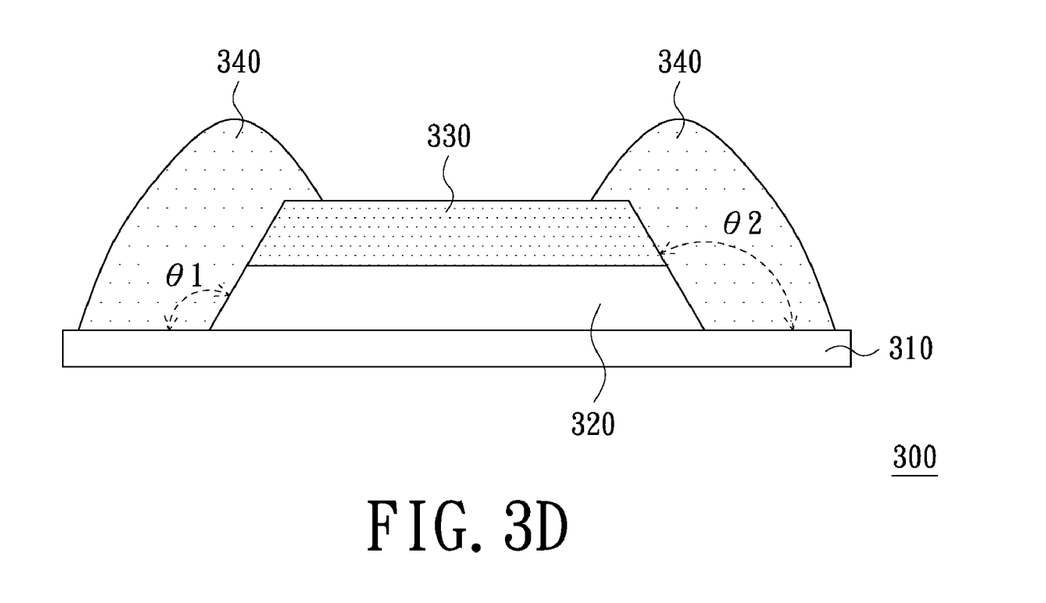

Referring to FIG. 3D, next, a sealant 340 is formed on the sealing region 313 of the surface 312 of the active element array substrate 310 to surround the E-ink layer 320 and the protective layer 330, so that the E-ink display device 300 can be substantially formed. In the embodiment, the sealant 340 is extended from a top of the protective layer 330 to the active element array substrate 310 along the second side wall 332 and the first side wall 322 orderly, and the sealant 340 can be made of adhesive material with viscosity in the range from 20,000 cp to 60,000 cp.

In details, a process of forming the sealant 340 can include the following steps. First, the liquid adhesive material is dripped from above the protective layer 330, and then the adhesive material is cured to form the sealant 340. Because the first side wall 322 of the E-ink layer 320 and the second side wall 332 of the protective layer 330 are tilted relative to the surface 312 of the active element array substrate 310, the liquid adhesive material that is dripped from above the protective layer 330 would flow along the second side wall 332 and the first side wall 322 to the surface 312 of the active element array substrate 310. As such, in the process of forming the sealant 340, air bubbles would not be generated between the sealant 340 and the first side wall 322 or the second side wall 332. Consequently, the process yield of the E-ink display device 300 can be increased, and the reliability of the E-ink display device 300 can be improved.

Figure 4:
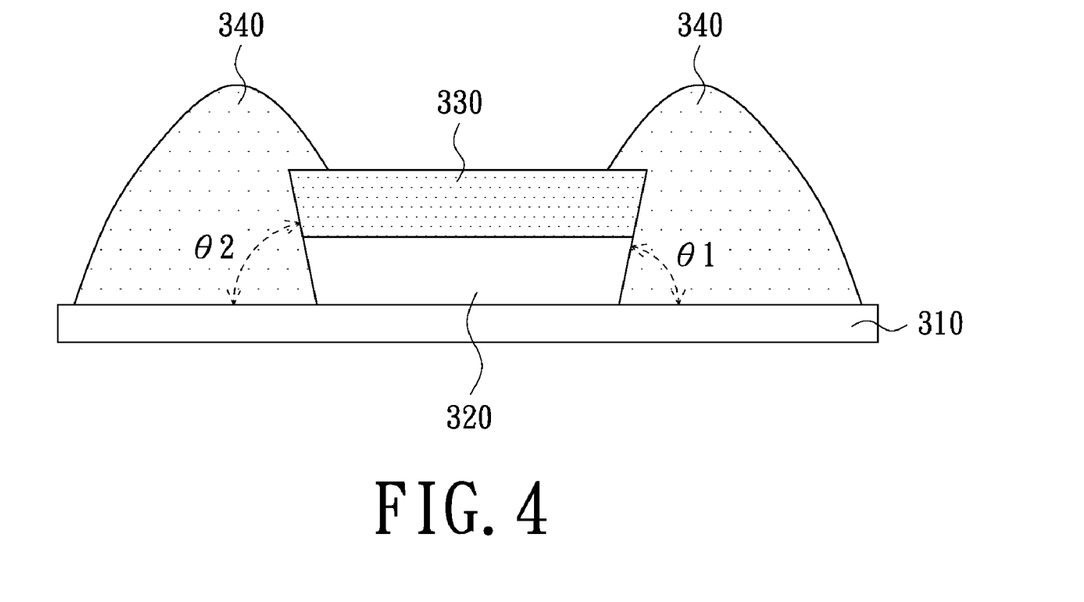
FIG. 4 is a schematic cross-sectional view of an E-ink display device according to another exemplary embodiment of the present invention.

In other embodiments, referring to FIG. 4, the E-ink layer 320 and the protective layer 330 can be cut with other angles, so that the first included angle θ1 and the second θ2 can be smaller than 90 degrees. If the first included angle θ1 is smaller than 90 degrees, a distance from the E-ink layer 320 to the outside of the E-ink display device would greater than that from the E-ink layer 120 to the outside of the conventional E-ink display device 100 of FIG. 1. Therefore, the outside moisture would be hard to penetrate into the E-ink layer 320 through the sealant 340.

It should be understood that, the E-ink layer 320 and the protective layer 330 can be cut in different processes. In other words, the first included angle θ1 can be different with the second included angle θ2, and the first included angle θ1 and the second included angle θ2 can be configured according the actual needs, and the present invention is not limited herein.

Figure 5:
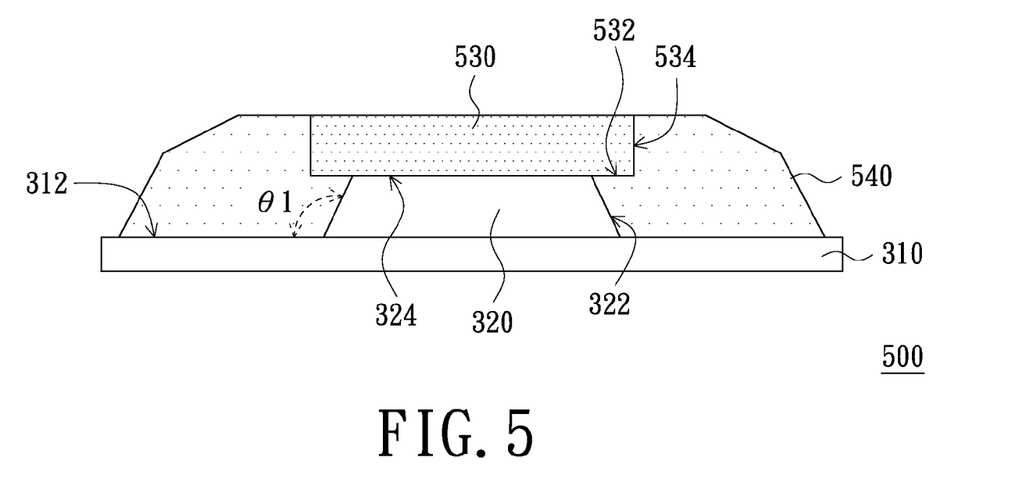
FIG. 5 is a schematic cross-sectional view of an E-ink display device according to another exemplary embodiment of the present invention.

In addition, the protective layers with various sizes can be used to couple with the E-ink layer correspondingly so as to improve the sealing performance of the sealant. Embodiments will be described with reference to the accompanying drawings. FIG. 5 is a schematic cross-sectional view of an E-ink display device according to another exemplary embodiment of the present invention. Referring to FIG. 5, the E-ink display device 500 includes an active element array substrate 310, an E-ink layer 320, a protective layer 530 and a sealant 540. In the embodiment, the components with labels that are the same with the labels of the components in the above embodiment are the same or similar to the components in the above embodiment correspondingly, and these will not be described repeatedly herein.

The E-ink layer 320 has a first surface 324. The protective layer 530 has a second surface 532. The second surface 532 is in contact with the first surface 324. That is, the protective layer 530 is disposed on the first surface 324 of the E-ink layer 320. In particular, an area of the second surface 532 is larger than that of the first surface 324. In other words, only a portion of the second surface 532 is in contact with the first surface 324.

As mentioned above, the sealant 540 is formed by dripping liquid adhesive material from above the protective layer 530 and then curing the adhesive material to form the sealant 540. Viscosity of the adhesive material can be in the range from 10,000 cp to 70,000 cp. In the process of dripping the liquid adhesive material from above the protective layer 530, the liquid adhesive material may flow from the second side wall 534 of the protective layer 530 to the first side wall 322 of the E-ink layer 320 due to capillarity. As a first included angle θ1 defined between the first side wall 322 and the sealing region 313 of the surface 312 is larger than 90 degrees, the liquid adhesive material can flow to the active element array substrate 310 along the first side wall 322, and then be cured to form the sealant 540. As such, air bubbles would not be generated between the E-ink layer 320 and the sealant 540. Furthermore, because the area of the second surface 532 is larger than that of the first surface 324, a possible path from which the outside moisture may penetrate into the E-ink layer 320 through the sealant 540 can be prolonged.

It should be understood that, in the present invention, if the first side wall 322 is not perpendicular to the surface 312 of the active element array substrate 310, the liquid adhesive material would flow to the active element array substrate 310 along the first side wall 322, and thus the air bubbles would not be generated. Therefore, in another embodiment, as shown in FIG. 6, the first included angle θ1 defined between the first side wall 322 and the sealing region 313 of the surface 312 can be smaller than 90 degrees.

Figure 6:
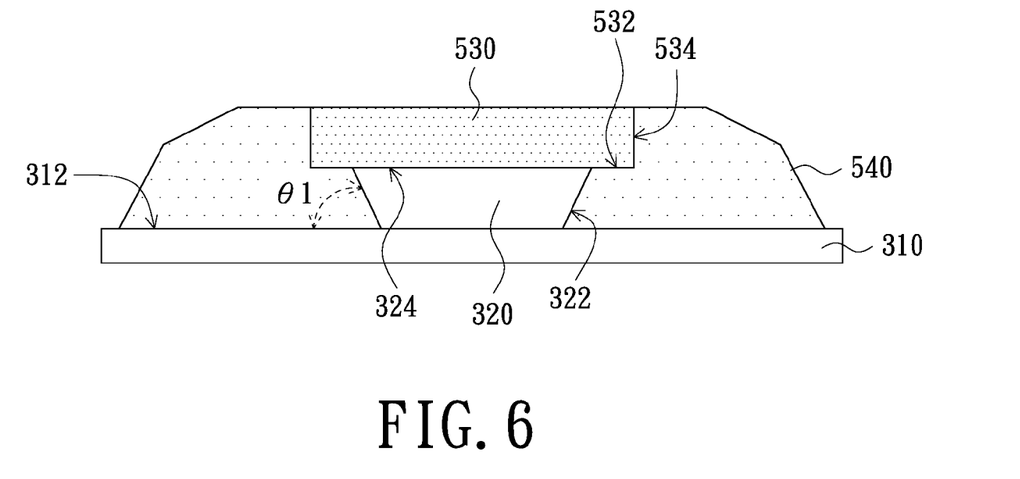
FIG. 6 is a schematic cross-sectional view of an E-ink display device according to another exemplary embodiment of the present invention.
Figure 7:
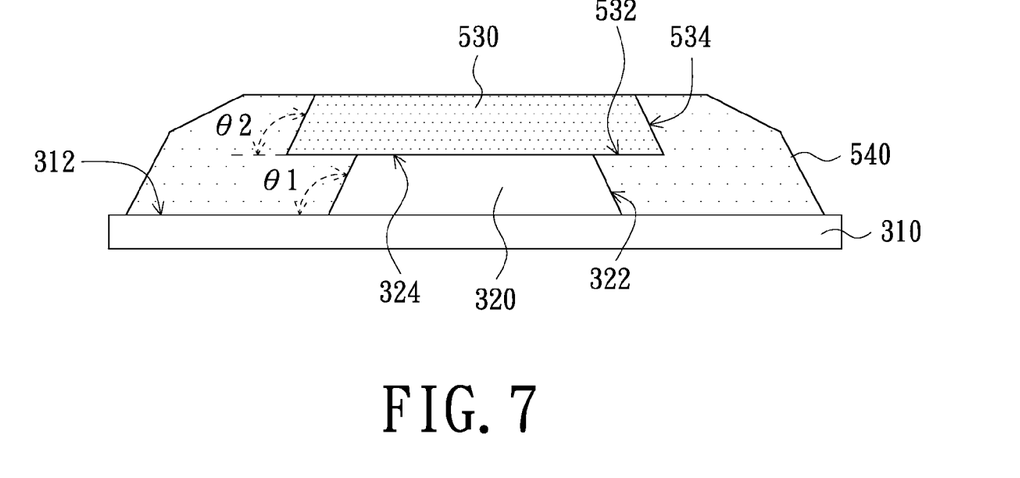
FIG. 7 is a schematic cross-sectional view of an E-ink display device according to another exemplary embodiment of the present invention.
Figure 8:
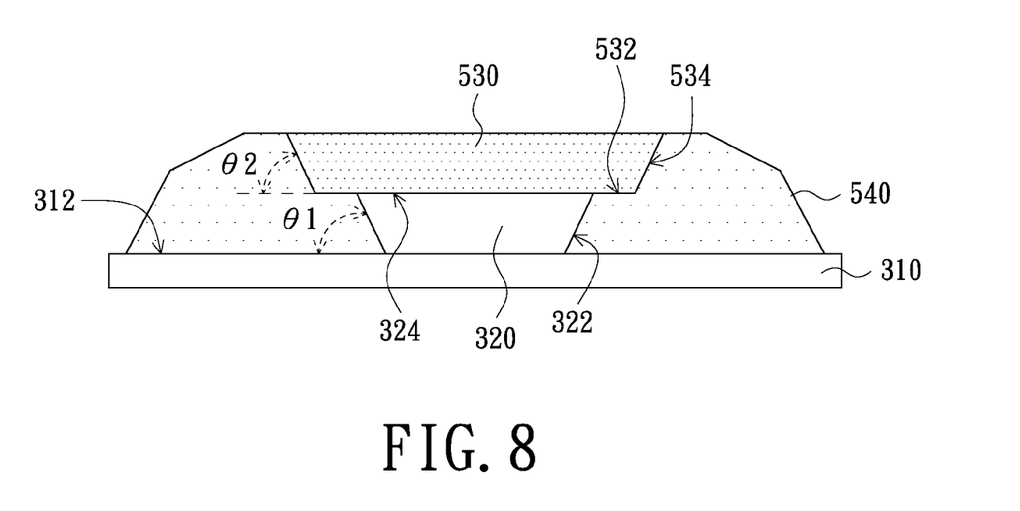
FIG. 8 is a schematic cross-sectional view of an E-ink display device according to another exemplary embodiment of the present invention.
Figure 9:
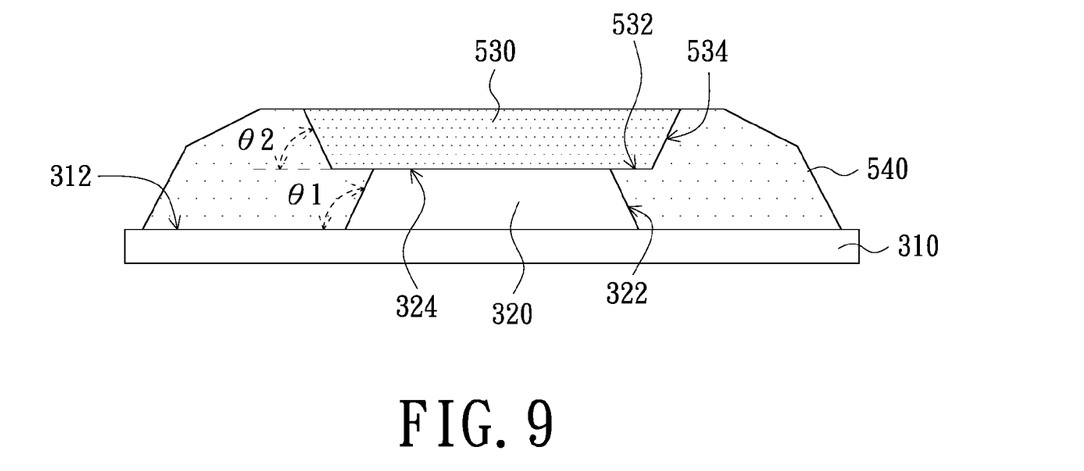
FIG. 9 is a schematic cross-sectional view of an E-ink display device according to another exemplary embodiment of the present invention.
Figure 10:
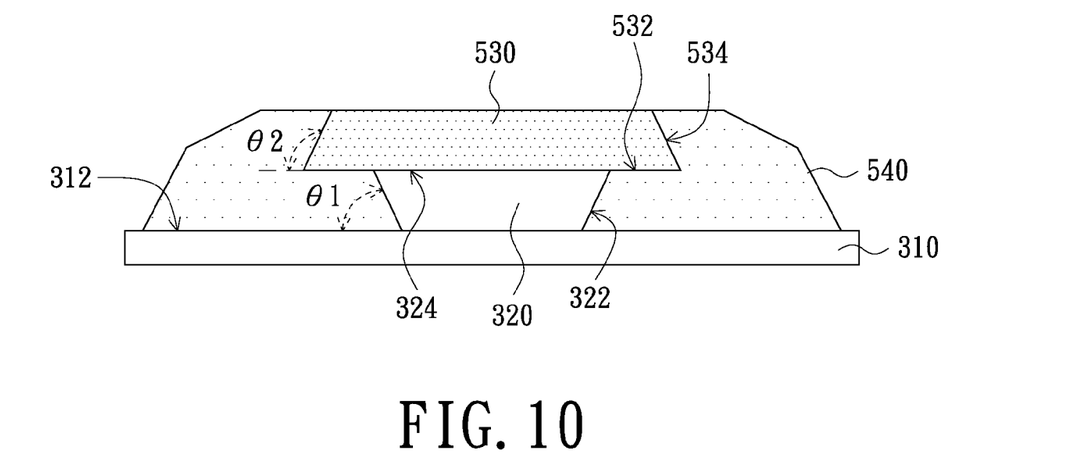
FIG. 10 is a schematic cross-sectional view of an E-ink display device according to another exemplary embodiment of the present invention.

In the embodiments of FIGS. 5 and 6, in order to increase the thickness of the sealant 540, the sizes of the protective layer 530 are larger than that of the E-ink layer 320. However, the present invention is not limited whether the second side wall 534 of the protective layer 530 is tilted relative to the surface 312 of the active element array substrate 310 or not. In the embodiments of FIGS. 5 and 6, the second side wall 534 of the protective layer 530 is perpendicular to the surface 312, but in other embodiments, the second included angle θ2 defined between the second side wall 532 of the protective layer 530 and the sealing region 313 of the surface 312 and the first included angle θ1 can be larger than 90 degrees simultaneously, as shown in FIG. 7, or smaller than 90 degrees simultaneously, as shown in FIG. 8. In addition, the first included angle θ1 and the second included angle θ2 can be respectively smaller than 90 degrees or larger than 90 degrees, as shown in FIGS. 9 and 10.

In summary, the E-ink display device of the present invention includes the E-ink layer that has the side wall tilted relative to the surface of the active element array substrate, so that in the subsequently process of forming the sealant, the liquid adhesive material can flow to the active element array substrate along the first side wall, and thus the air bubbles would not be generated between the E-ink layer and the sealant. Furthermore, because the protective layer has the oblique side wall or has the relative larger size, the possible path from which the outside moisture may penetrate into the E-ink layer through the sealant can be prolonged, and thus the waterproof performance of the E-ink display device can be further improved. Therefore, the present invention would improve the waterproof performance of the E-ink display device and increase the process yield of the E-ink display device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An E-ink display device, comprising:
an active element array substrate having a surface, the surface including a contacting region and a sealing region;

an E-ink layer disposed on the contacting region and having a first side wall, a first included angle defined between the first side wall and the surface being smaller than 90 degrees or larger than 90 degrees;
a protective layer disposed on the E-ink layer and having a second side wall, a second included angle defined between the second side wall and the surface being smaller than 90 degrees or larger than 90 degrees; and
a sealant disposed on the sealing region and surrounding the E-ink layer and the protective layer.

2. The E-ink display device according to claim 1, wherein the first side wall and the second side wall are substantially aligned on the same plane, and the sealant is extended from a top of the protective layer to the active element array substrate along the second side wall and the first side wall.

3. The E-ink display device according to claim 2, wherein the sealant is made of adhesive material with viscosity in the range from 20,000 cp to 60,000 cp.

4. The E-ink display device according to claim 1, wherein the E-ink layer has a first surface, the protective layer has a second surface, an area of the second surface is larger than that of the first surface, and the first surface is in contact with a portion of the second surface.

5. The E-ink display device according to claim 4, wherein the sealant is made of adhesive material with viscosity in the range from 10,000 cp to 70,000 cp.

6. A method for manufacturing an E-ink display device, comprising:
providing an active element array substrate having a surface, the surface including a contacting region and a sealing region;
cutting an E-ink layer and a protective layer, such that the E-ink layer has a first side wall and the protective layer has a second side wall;
disposing the E-ink layer on the contacting region, a first included angle defined between the first side wall and the surface being smaller than 90 degrees or larger than 90 degrees;
disposing the protective layer on the E-ink layer, a second included angle defined between the second side wall and the surface being smaller than 90 degrees or larger than 90 degrees; and
forming a sealant on the sealing region to surround the E-ink layer and the protective layer.

7. The method according to claim 6, wherein a process of cutting the E-ink layer and the protective layer is performed by laser cutting.

8. The method according to claim 6, wherein the E-ink layer and the protective layer are cut in the same cutting process, and a process of forming the sealant comprises:
dripping adhesive material from above the protective layer to make the adhesive material flow from a top of the protective layer to the active element array substrate along the second side wall and the second side wall; and
curing the adhesive material to form the sealant that covers a portion of the protective layer, the first side wall, the first side wall and a portion of the sealing region.

9. The method according to claim 6, wherein the E-ink layer has a first surface, the protective layer has a second surface, the E-ink layer and the protective layer are cut in different cutting processes to make an area of the second surface larger than that of the first surface, and in a process of disposing the protective layer on the E-ink layer, a portion of the second surface is applied to contact with the first surface.

10. An E-ink display device, comprising:
an active element array substrate having a surface, the surface including a contacting region and a sealing region;
an E-ink layer disposed on the contacting region and having a first side wall and a first surface, a first included angle defined between the first side wall and the surface being smaller than 90 degrees or larger than 90 degrees;
a protective layer disposed on the first surface of the E-ink layer and having a second surface, an area of the second surface being larger than that of the first surface, a portion of the second surface being in contact with the first surface; and
a sealant disposed on the sealing region and surrounding the E-ink layer and the protective layer.

11. The E-ink display device according to claim 10, wherein the sealant is made of adhesive material with viscosity in the range from 10,000 cp to 70,000 cp.

12. A method for manufacturing an E-ink display device, comprising:
providing an active element array substrate having a surface, the surface including a contacting region and a sealing region;
cutting an E-ink layer to make the E-ink layer have a first side wall;
disposing the E-ink layer on the contacting region, a first included angle defined between the first side wall and the surface being smaller than 90 degrees or larger than 90 degrees;
disposing the protective layer on a first surface of the E-ink layer, the protective layer having a second surface, an area of the second surface being larger than that of the first surface, a portion of the second surface being in contact with the first surface; and
forming a sealant on the sealing region to surround the E-ink layer and the protective layer.

13. The method according to claim 12, wherein a process of cutting the E-ink layer is performed by laser cutting.

* * * * *